(12) United States Patent
Lynch et al.

(10) Patent No.: US 8,301,193 B1
(45) Date of Patent: Oct. 30, 2012

(54) DIFFERENTIAL PLANES FOR VIDEO I/O IN A HEARING IMPAIRED APPLICATION

(75) Inventors: John David Lynch, Olathe, KS (US); Eric Eugene Miller, Olathe, KS (US); Charles Daniel Todd, Parkville, MO (US); Monika Kishor Panpaliya, Leawood, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1029 days.

(21) Appl. No.: 12/263,688

(22) Filed: Nov. 3, 2008

(51) Int. Cl.
*H04M 1/00* (2006.01)

(52) U.S. Cl. ............... 455/556.1; 348/14.02; 348/14.03; 348/14.04; 709/201

(58) Field of Classification Search .... 348/14.01–14.16; 370/259–271, 351–356; 709/201–207, 217–248; 455/412.1–417, 426.1, 426.2, 550.1–560, 455/575.1–575.9, 90.1–90.3
See application file for complete search history.

(56) References Cited

U.S. PATENT DOCUMENTS

| | | | |
|---|---|---|---|
| 6,724,862 B1 * | 4/2004 | Shaffer et al. ................ | 379/52 |
| 7,546,130 B2 * | 6/2009 | Vance ........................ | 455/463 |
| 7,643,619 B2 * | 1/2010 | Jung ............................ | 379/52 |
| 7,742,068 B2 * | 6/2010 | Cupal et al. ................ | 348/14.01 |
| 7,949,368 B2 * | 5/2011 | Hurula et al. ............... | 455/556.1 |
| 8,040,864 B2 * | 10/2011 | Karaoguz et al. ........... | 370/338 |
| 2006/0062371 A1 * | 3/2006 | Vanderheiden et al. . | 379/211.02 |
| 2006/0125914 A1 * | 6/2006 | Sahashi ...................... | 348/14.02 |
| 2006/0189278 A1 * | 8/2006 | Scott .......................... | 455/90.3 |
| 2007/0191070 A1 * | 8/2007 | Rao ............................ | 455/566 |
| 2007/0238484 A1 * | 10/2007 | Liu ............................ | 455/557 |
| 2009/0186653 A1 * | 7/2009 | Drader et al. .............. | 455/556.1 |
| 2009/0323905 A1 * | 12/2009 | Fields et al. ................ | 379/52 |

OTHER PUBLICATIONS

Samsung Q1 Ultra Mobile PC User's Manual, 2007, Samsung Corporation, 227 pp. (relevant pp. are 34-41 and 138-140).

* cited by examiner

*Primary Examiner* — Hemant Patel (57) ABSTRACT

A mobile communications device, method, and medium are provided for enhanced video communications for hearing-impaired users. A hearing-impaired call mode can be selected by a user, causing the device to establish a hearing-impaired call mode configuration. Establishing a hearing-impaired call mode configuration can include disabling a microphone and speakers and enabling an adjustable camera. The adjustable camera can tilt, pan, change focus, and the like to maintain a region of interest within a viewing angle of the camera.

7 Claims, 7 Drawing Sheets

DIFFERENTIAL PLANES FOR VIDEO I/O IN A HEARING IMPAIRED APPLICATION

BACKGROUND

Many currently available desk and handheld communications devices are manufactured for the mainstay customer, and often fail to provide a comfortable and effective communication experience for persons with hearing impairment or persons attempting to communicate with hearing impaired persons. Hearing-impaired persons often communicate using a combination of hand movement and facial expressions. This type of communication is difficult with many current communications devices that are designed such that a user's eyes look directly at a display screen and a video camera captures an image of the user's head.

SUMMARY

Embodiments of the invention are defined by the claims below, not this summary. A high-level overview of embodiments of the invention are provided here for that reason, to provide an overview of the disclosure.

In a first aspect, a set of computer-executable instructions provides an exemplary method for establishing a call mode configuration on a mobile communications device having a display, a call mode selector, an adjustable camera, a microphone, and a speaker. According to an embodiment of the method, a first call mode configuration is provided in which the speaker and microphone are enabled. A user selection of a second call mode is received, and a second call mode configuration is established. In an embodiment, establishing the second call mode configuration includes disabling the speaker and enabling the adjustable camera.

In a second aspect, a set of computer-executable instructions provides another exemplary method for establishing a hearing-impaired call mode configuration of a mobile communications device having a display, a call mode selector, an adjustable camera, a microphone, and a speaker. In an exemplary embodiment, the method includes receiving a user selection of a hearing-impaired (HI) call mode and establishing an HI call mode configuration. According to one embodiment, establishing the HI call mode configuration includes disabling the microphone and speaker and enabling the adjustable camera. In an embodiment, the method also includes determining a region of interest that includes features such as, for example, the user's head and hands. The exemplary method further includes adjusting a viewing direction of the adjustable camera such that the region of interest is maintained within an angle of view of the adjustable camera. Embodiments of the method also include adjusting the camera's focal length and adjusting contrast and brightness settings to maximize the contrast of the movement of the user's hands as compared to other parts of the captured video.

In another aspect, a mobile communications device is provided that includes an adjustable camera mounted above the top edge of a display. The device also includes a call mode selector that allows a user to select between various modes such as, for example, a voice call mode and a hearing-impaired (HI) call mode.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Embodiments of the present invention provide systems and methods for facilitating communications involving hearing-impaired persons. By providing an adjustable camera in a mobile communications device, the camera can be adjusted such that a user's hands and face can be captured by the video camera. Additionally, call mode configurations are provided to increase the efficiency of configuring a mobile device for various types of calls.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, and the like. The invention may also be practiced in distributed computing environments where tasks are performed by remote-processing devices that are linked through a communications network.

Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1:
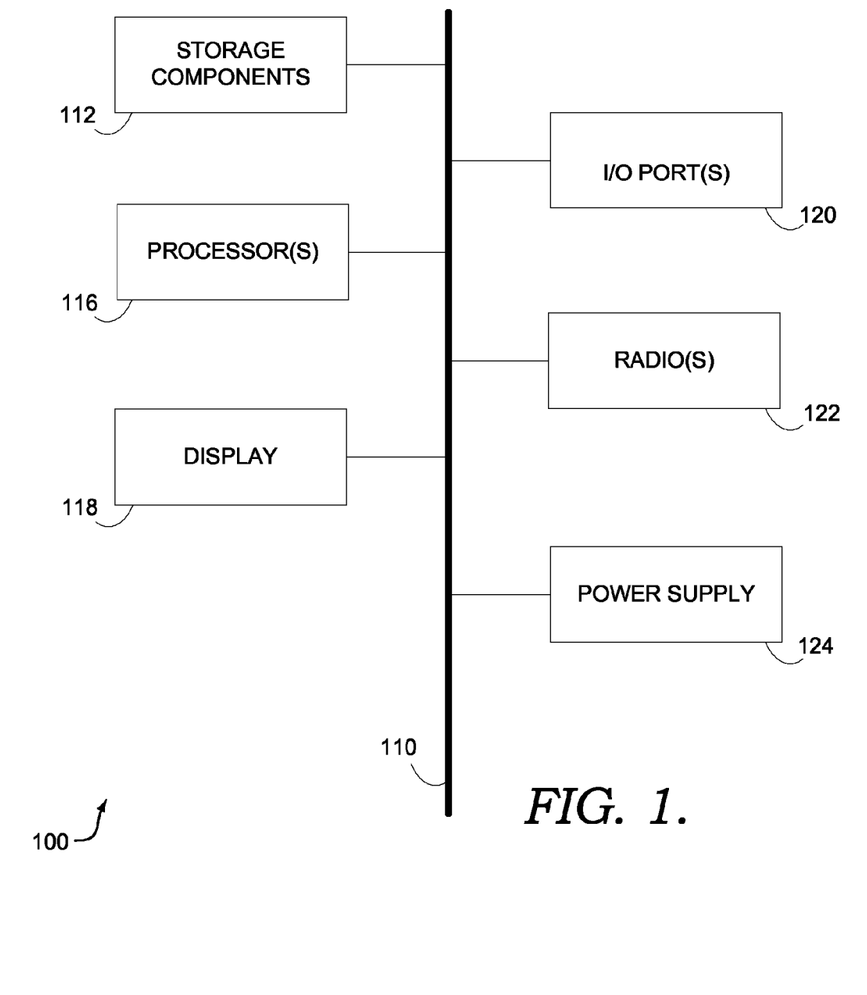
FIG. 1 is a block diagram showing an exemplary mobile communications device in accordance with an embodiment of the present invention.

FIG. 1 depicts an illustrative block diagram of a mobile communications device that is suitable for operation of an embodiment of the present invention. Throughout this disclosure, reference will be made to a mobile communications device, such as in FIG. 1 and beyond. FIG. 1 depicts a selection of components that will generally be included in the mobile communications device to help facilitate various functional aspects of embodiments of the invention. As shown, a bus 110 couples, directly or indirectly, the following illustrative components: a storage component 112, a processor 116, a display 118, input/output (I/O) ports 120, a radio or radios 122, and a power supply 124.

Storage components 112 may take the form of the aforementioned computer readable media. As with all of the illustrative components of FIG. 1, although we refer to them sometimes in the singular, that should not be read so as to imply that we mean only a single of each of the components is contemplated within the scope of our invention. To the contrary, by way of example, storage component or components 112 may actually be composed of constituent storage components located within mobile device 100.

Processors 116 facilitate a flow of information among all or a portion of the components shown in FIG. 1 as well as computer usable instructions that help facilitate various aspects of the present invention. For example, in one embodiment, an operating system of mobile device 100 also helps coordinate various functional aspects of the present invention. Processors 116 operate in connection with running such an operating system.

Input/output (I/O) ports 120 provide a way for mobile device 100 to interact with other peripheral components. Illustrative input/output ports include a ear-piece or headphone jack, a USB port, an infrared port, and the like. Different input/output ports 120 could be provided as is needed to facilitate communication of other peripheral components. Display 118 enables a user to view content. In an embodiment, display 118 can be a touchscreen display that receives user input as well. In another embodiment, display 118 is display screen for displaying content such as, for example, an LCD screen.

Radios 122 facilitate the communication of wireless communication signals to and from mobile device 100. Illustrative protocols that can be utilized in connection with an embodiment of the present invention include CDMA, EDGE, EV-DO, GPRS, GSM, UMTS, Wi-Fi, WiMAX, and the like. The radios 122 facilitate wireless communications between the device and a national or even global telecommunications network.

Power supply 124 may also take on a variety of forms ranging from a battery to a charging mechanism to other forms of power sources that serve to provide power to mobile device 100.

The selected components of mobile device 100 are meant to be illustrative in nature, and the various lower-level details of the components are not elaborated on so as to not obscure the present invention. Clearly, some of the components may be absent in some embodiments of the present invention, and additional components not shown may also be part of mobile device 100. Attempting to show all of the various components of mobile device 100 would obscure certain novel aspects, and we will refrain from such elaboration at least for the sake of brevity.

Figure 2:
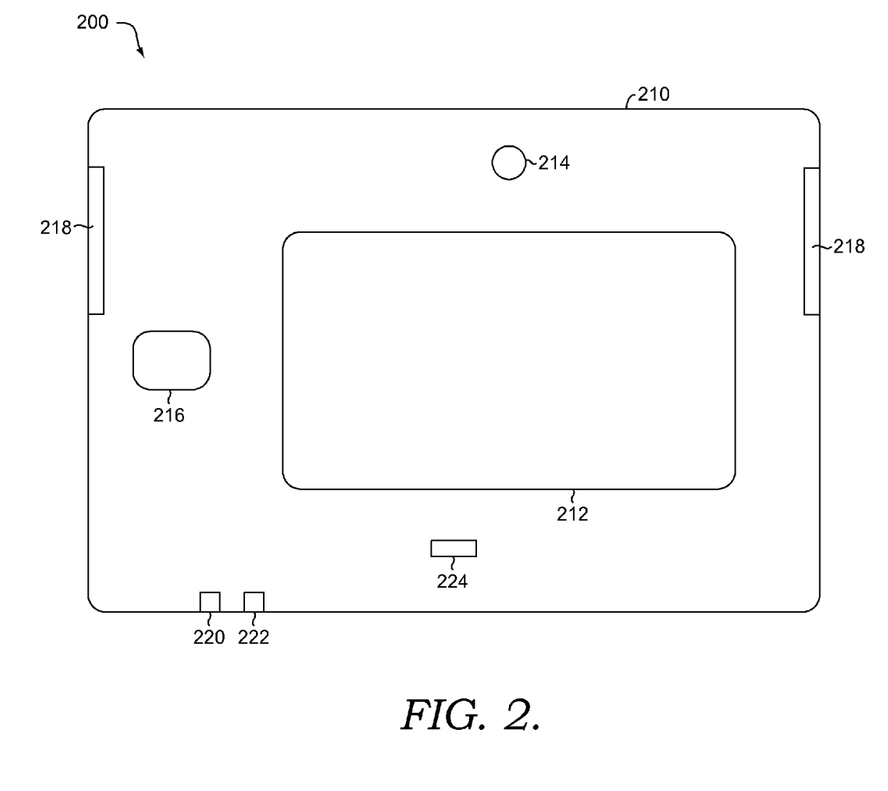
FIG. 2 depicts the front side of an exemplary mobile communications device in accordance with an embodiment of the present invention.

Turning now to FIG. 2, a block diagram is shown that illustrates a front side of an exemplary mobile communications device 200 in accordance with an embodiment of the present invention. Mobile device 200 can include any number of various types of mobile communications devices such as mobile communications device 100, described above with reference to FIG. 1. According to embodiments of the present invention, mobile device 200 can be a mobile phone, a smart phone, a computing device, a personal digital assistant (PDA) or any combination of these or other devices. In some embodiments, mobile device 200 can include portable computing and communications devices such as, for example, the Q1 ULTRA PREMIUM MOBILE PC, available from SAMSUNG ELECTRONICS CO. of Seoul, Korea and the N810 INTERNET TABLET WIMAX, available from NOKIA CORPORATION of Espoo, Finland. Mobile device 200 can have the ability to present multimedia content such as, for example, TV shows, movies, videos, MP3 files, and radio programs. This list is not exhaustive. Media may be presented as it is received from a wireless network or from memory within the mobile device 200. Mobile device 200 can also be capable of receiving numerous forms of communication. Examples of communications that can be received include phone calls, video calls, text messages, multimedia messages, emails, calendar updates, and task reminders.

As illustrated in FIG. 2, mobile device 200 includes a front side 210 having a display 212. Disposed above the display 212 is an adjustable video camera 214. Device 200 also includes a call mode selector 216, a pair of speakers 218, input/output jacks 220 and 222 and a microphone 224. In some embodiments of the present invention, any one or more of the above features can be disposed on a side of the mobile communications device other than the front side. For example, in an embodiment, the call mode selector 216 is disposed on a side of the mobile communications device. In other embodiments, mobile device 200 can include additional features such as, for example, keypads (e.g., QWERTY, numeric, etc.), additional microphones or speakers, and the like. Features, both those that are illustrated in FIG. 2 and those that are not, can be arranged in any number of alternative arrangements so long as the adjustable camera 200 is disposed in a manner such that it can capture video images of a user's hands and face while the user views display 212. For example, in some embodiments, adjustable video camera 214 and display 212 can be disposed on an outward front surface of a top portion of the device having a keypad disposed below the top portion such that the keypad can be slid underneath the top portion.

In an embodiment, display 212 is a touch-screen display configured for receiving touch input from a user's finger, from a stylus, or any other object that can be used to produce touch input on a touch-screen device. In another embodiment, display 212 is an LCD display device. In embodiments, display 212 can include any type of display device suitable for displaying video images on mobile device 200.

Adjustable video camera 214 includes, for example, a camera lens that faces away from the front surface 210 of the device 200 and an adjustment mechanism for adjusting the orientation of the camera, the focal length, the viewing angle, and the like. According to embodiments, adjustable video camera 214 is centered with respect to the right and left edges of the display. In embodiments, adjustable video camera 214 can be tilted and in another embodiment, adjustable video camera 214 can be panned. Adjustable camera 214 can also include zoom capabilities. Operations such as tilting, panning, adjusting focus, and the like can be performed automatically, according to embodiments of the present invention. In other embodiments, operations can be performed manually. The adjustment mechanism will be explained more fully below.

Call mode selector 216 allows a user to select between a number of call modes. In response to a user selection of a call mode, mobile device 200 automatically establishes a call mode configuration corresponding to the selected call mode. As used herein, call modes include attributes of mobile device 200 associated with particular communication types. For example, mobile device 200 can have a normal voice call mode, a normal video call mode, a hearing-impaired (HI) video call mode, and the like. To allow users to select between call modes, call mode selector 216 can be configured to receive user input. For example, in embodiments, call mode selector 216 can be a button, a switch, or the like. In one embodiment, display 212 is a touch-screen display and call mode selector 216 is a region on the touch-screen that has a predetermined input region associated therewith such that a user can touch the call mode selector 216 to switch between call modes. In some embodiments, call mode selector 216 is represented by an icon or other graphic on display 212.

With continued reference to FIG. 2, speakers 218, input/output jacks 220 and 222, and microphone 224 can be of any number of types and styles, and the depiction of FIG. 2 and the discussion of FIG. 2 herein are not intended to limit the scope of the present invention to the illustrated configurations. Additionally, mobile device 200 need not include all of the illustrated features 218, 220, 222, and 224.

Figure 3:
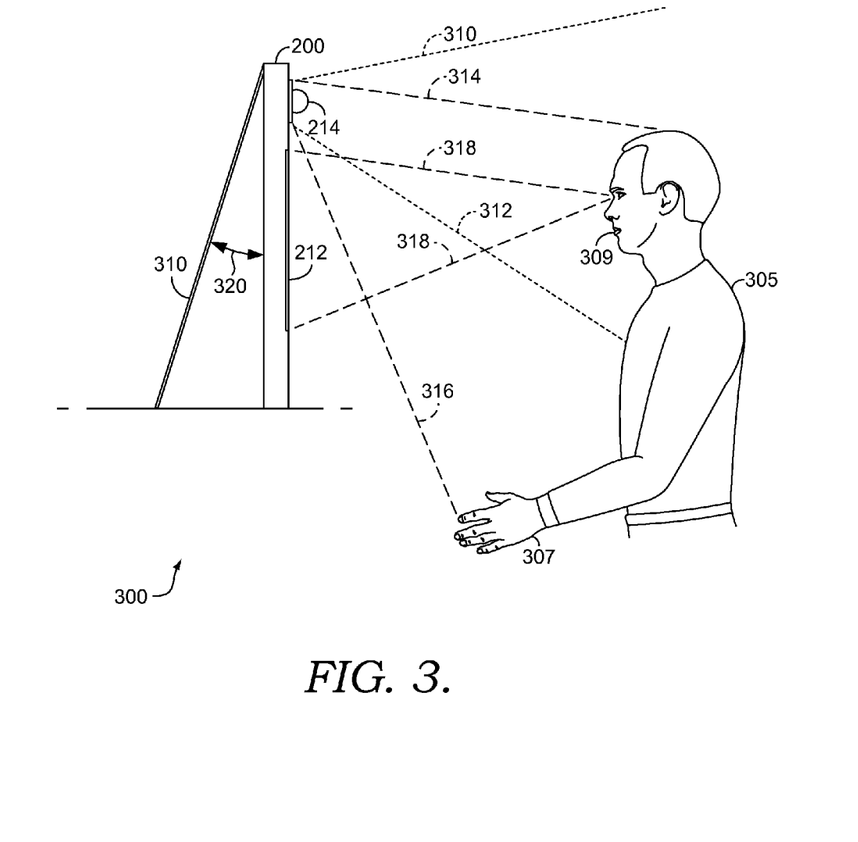
FIG. 3 is a schematic drawing illustrating an exemplary implementation of an embodiment of the present invention.

Turning now to FIG. 3, a schematic drawing illustrating an exemplary implementation 300 of an embodiment of the present invention is shown. The illustrated implementation 300 includes mobile device 200, which has a display 212 and an adjustable video camera 214. Adjustable video camera 214 is illustrated in FIG. 3 as including a portion (such as a lens or lens module) that protrudes outward from the surface of mobile device 200. In an embodiment, the camera's lens can be positioned such that it protrudes from the surface of mobile device 200 thereby enabling adjustment of the lens by using a wide range of tilt and pan operations while utilizing the majority of the camera's angle of view. In another embodiment, similar functionality may be accomplished by disposing a lens within a protruding cover, or bubble, that protects the lens. However, the depiction of FIG. 3 is not intended to limit the structure and placement of adjustable video camera 214. In some embodiments, adjustable video camera 214 can be positioned in a more flush position with respect to the surface of mobile device 200. In other embodiments, the position of adjustable video camera 214 with respect to the surface of mobile device 200 can be adjustable, either manually or automatically.

Mobile device 200 also includes a viewing stand 310 that is rotatably attached along an upper edge of the stand to the back side of mobile device 200. Although depicted in FIG. 3 as being attached along a top edge of mobile device 200, in other embodiments, viewing stand 310 can be attached along different positions on the back of mobile device 200. For example, in one embodiment, stand 310 is attached near the middle of the back side of mobile device 200. In other embodiments, mobile device 200 may include a recessed area on the back side of mobile device 200 such that viewing stand 310 can be folded against the back of mobile device 200 and inside the recessed area, leaving the back side surface of mobile device 200 relatively flush.

In various embodiments, viewing stand 310 allows a user to position mobile device 200 in a somewhat upright orientation such that the user's hands 307 can be free. This feature enables an improved video communication experience for hearing-impaired persons as they will be able to freely communicate with both hands 307 such as, for example, when using American Sign Language. In an embodiment an angle 320 between viewing stand 310 and mobile device 200 can be adjusted by the user such that mobile device 200 can be positioned in an optimal position for the particular user's style of communication, size of hands, height, and the like. In this way, mobile device 200 can be positioned such that the user 305 can have an effective view 318 of the display 212 while the user's hands 307 and face 309 can be captured within the camera's angle of view, which is illustrated by the lines 314 and 316.

As shown in FIG. 3, when a user 305 views 318 the display 212 from a position roughly perpendicular to the plane of the display 212, a stationary camera would have an angle of view (illustrated by lines 310 and 312) that does not include the user's hands 307. Although this arrangement is adequate for normal video calls in which the visual communication typically is centered on the user's face 309, the arrangement may be undesirable for video communications by or with a hearing-impaired person. Hearing-impaired communication typically includes hand movement and facial expressions, and accordingly, effective video communications involving hearing-impaired persons can include video images captured with a camera viewing angle, illustrated by lines 314 and 316, that incorporates both the user's hands 307 and the user's face 309. Thus, the user 305 can position mobile device 200 as desired using the viewing stand 310, and the mobile device 200 can be configured such that the adjustable video camera 214 pans and/or tilts to a position that allows for the viewing angle illustrated by lines 314 and 316. In embodiments, the focal length of the camera can also be adjusted based on the proximity of the user 305 to the device 200, the size of the user 305, and other factors. The ability to adjust the angle of view of the camera 214 allows the user 305 to position mobile device 200 such that the user 305 can view 318 the display 212 from a position that is substantially perpendicular to the plane of the display 212 while still being able to communicate using the user's hands 307 and face 309 because the adjustable camera 214 can be adjusted to keep these features within the camera's viewing angle.

In some embodiments, adjustable camera 214 can be adjusted automatically, and in other embodiments, adjustable camera 214 can be adjusted manually. According to one embodiment, mobile device 200 can include a toggle or selector for selecting whether to adjust the camera 214 manually or automatically. In further embodiments, adjustable video camera 214 can automatically and dynamically adjust its viewing angle continuously such that if the user 305 shifts to one direction or another, or moves farther away from or closer to adjustable video camera 214, the features (e.g., region of interest) can be maintained within the camera's viewing angle, as illustrated by lines 314 and 316.

In an embodiment, adjustable video camera 214 can also be designed to tilt and/or pan with any suitable range. For example, in one embodiment, adjustable video camera 214 can be moved by up to 30 degrees. In other embodiments, adjustable video camera 214 can move within a much larger range. In some embodiments, adjustable camera 214 is configured to tilt or pan according to step-wise increments of several degrees. In further embodiments, adjustable video camera 214 tilts or pans in a continuous fashion.

Figure 4:
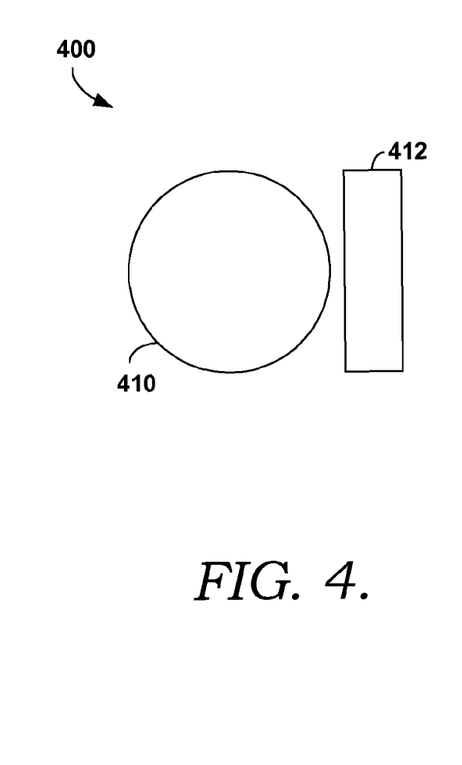
FIGS. 4-6 depict exemplary adjustable cameras suitable for implementation with embodiments of the present invention.

Turning now to FIG. 4, an illustrative adjustable camera 400 design in accordance with an embodiment of the present invention is shown. Adjustable camera 400 includes a lens module 410 and a manual adjustment module 412. Lens module 410 can be a camera lens or can include a camera lens. In embodiments, lens module includes a camera lens mounted to an adjustment mechanism, which will be described more fully with reference to FIGS. 5 and 6. In embodiments, manual adjustment module 412 can be disposed to one side of lens module 410. In other embodiments, manual adjustment module 412 can be disposed above or below lens module 410. In further embodiments, manual adjustment module 412 can be disposed in any number of other locations such as, for example, on a side edge of the mobile device, elsewhere on a front surface of the mobile device, or even on the back surface of the mobile device.

As described more fully below, adjustable camera 400 can be manually adjusted by a user via manual adjustment module 412. Manual adjustment module 412 can include a switch, a button, a pair of buttons, a track ball, a wheel, or any other kind of user input component that can be manipulated to adjust a viewing angle of adjustable camera 400. In an embodiment, manual adjustment module 412 can be coupled with a mechanical adjustment mechanism such that manipulation of a user input component of adjustment module 412 is mechanically translated into a change in position of lens module 410. In another embodiment, manual adjustment module 412 can be coupled with a motor such that manipulation of a user input component of adjustment module 412 is electronically, or even digitally, translated into a change in position of lens module 410. Similar components and functionality can be included for other types of adjustments such as, for example, zoom, lighting, and the like.

As described above, some embodiments of the present invention include a capability for dynamically updating a viewing angle associated with lens module 410. User manipulation of manual adjustment module 412 can cause an automatic disablement of the dynamic update feature. In another embodiment, options can be presented to a user for allowing the device to dynamically adjust the position of lens module 410 or for disabling that functionality so that the user can manually adjust the camera 400 by manipulating a user input component of manual adjustment module 412. In some instances, manual adjustment module 412 can be utilized by a user to adjust a starting position associated with lens module 410, and can be used in some cases to center features (e.g., a region of interest) within a viewing angle associated with lens module 410. Once an initial position is set, automatic updating of that position can be enabled in some embodiments. In further embodiments, adjustable video cameras 400 can be provided that do not include a manual adjustment module 412.

Figure 5:
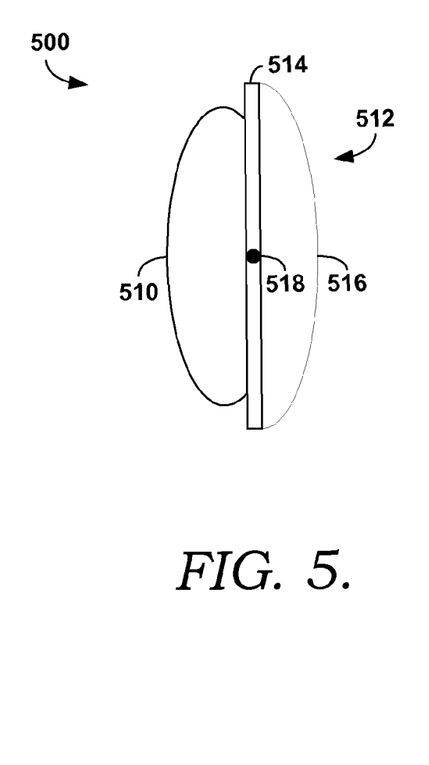

Turning now to FIG. 5, another illustrative adjustable video camera 500 is depicted in accordance with an embodiment of the present invention. As illustrated in FIG. 5, adjustable video camera 500 includes a lens module 510 and an adjustment mechanism 512. Adjustment mechanism 512, as discussed above, can be mechanically coupled to a manual adjustment module 412 such as that illustrated in FIG. 4. In other embodiments, adjustment mechanism 512 includes an electric or magnetic motor for adjusting lens module 510.

In an embodiment illustrated in FIG. 5, adjustment mechanism 512 includes a mounting member 514 to which lens module 510 can be fixably or moveably attached. Adjustment mechanism 512 also includes a rocker 516 that facilitates rotational movement of the lens module 510 about a pivot point 518. In embodiments, rocker 516 can be coupled to a motor or to a manual adjustment module 412. In other embodiments, rocker 516 is disposed in a cradle that can be adjustable and that facilitates the rotational movement of rocker 516 around pivot point 518, thereby adjusting the viewing angle associated with lens module 510.

Figure 6:
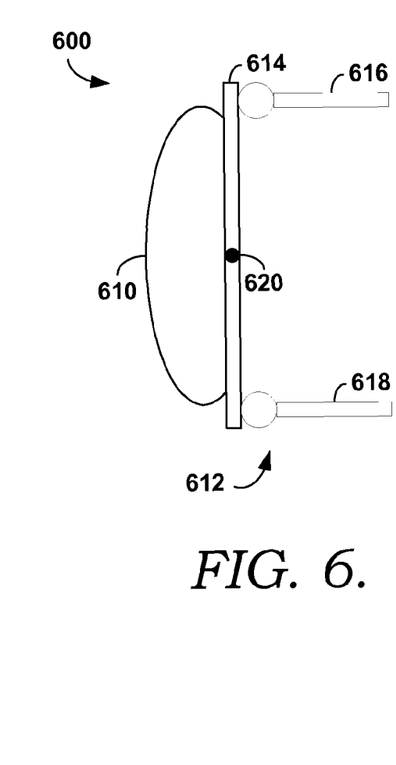

Turning to FIG. 6, another illustrative depiction of an adjustable video camera 600 is shown. Adjustable video camera 600 includes a lens module 610 and an adjustment mechanism 612. Adjustment mechanism 612, as illustrated in FIG. 6, can include a piezoelectric motor that has at least two columns 616 and 618 that can expand or contract based on electric current applied to them. In an embodiment, columns 616 and 618 can maintain a substantially constant size and orientation, but can be configured to apply a charge or a magnetic field to an edge of mounting member 614. In response, mounting member 614 may rotate about pivot point 620, thereby adjusting the viewing angle of lens module 610. In an embodiment, adjustment mechanism 612 includes two columns 616 and 618, one disposed at a top edge of mounting member 614 and one disposed at a bottom edge of mounting member 614. In another embodiment, four or more columns 616 and 618 can be used to provide a wider range of movement choices associated with lens module 610. For example, a pair of columns 616 and 618 disposed at the top and bottom, respectively, of mounting member 614 can be configured to adjust the tilt of camera 600, while a second pair of columns 616 and 618 disposed on either side of mounting member 614 can be configured to adjust the pan of camera 600. It should be understood by those of ordinary skill in the art that there may be other ways of designing and implementing adjustable video camera 600, and the descriptions and illustrations herein are not intended to limit the scope of such designs. Accordingly, any number of adjustable camera designs that provide the functional capabilities described herein are considered to be within the ambit of the present invention.

Figure 7:
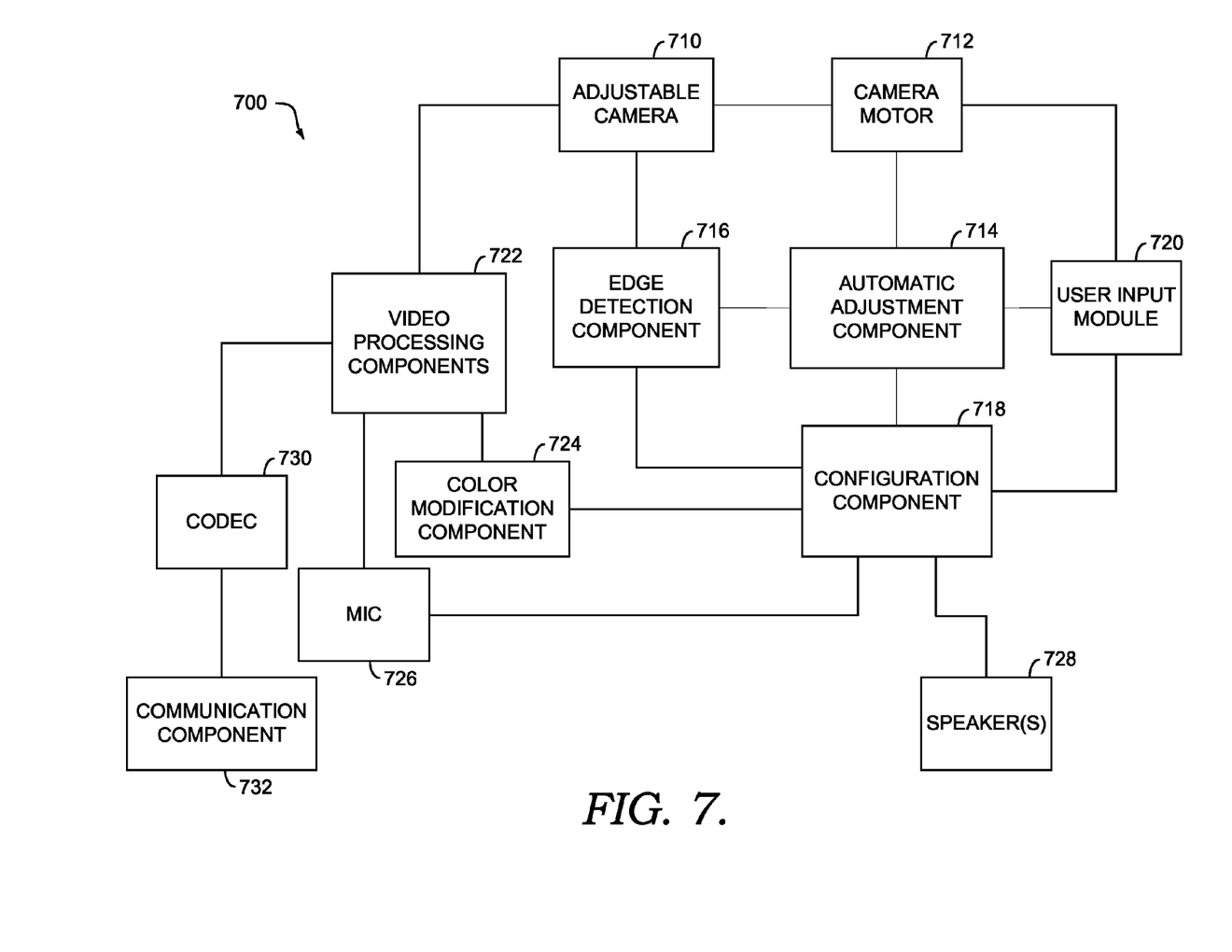
FIG. 7 is a schematic drawing illustrating an exemplary computing system suitable for implementation of an embodiment of the present invention.

Turning now to FIG. 7, a schematic drawing illustrating an exemplary video communication system 700 suitable for implementation of an embodiment of the present invention is shown. Video communication system 700 is merely an example of one suitable video communication system and is not intended to suggest any limitation as to the scope of use or functionality of the present invention. Neither should video communication system 700 be interpreted as having any dependency or requirement related to any single component or combination of components illustrated therein.

As illustrated in FIG. 7, video communication system 700 includes an adjustable camera 710, a camera motor 712, an automatic adjustment component 714, an edge detection component 716, and a configuration component 718. Also illustrated in video communication system 700 are a user input module 720, video processing components 722, a color modification component 724, a microphone ("mic") 726, speaker(s) 728, a video codec 730, and a communication component 732. In embodiments, various combinations of components 712, 714, 716, 718, 720, 722, 724, 730, and 732 can be implemented within other modules or components. In some embodiments, additional components can be included in video communication system 700 to provide or enhance various features, capabilities, and the like.

Adjustable camera 710 can be adjusted by camera motor 712. In embodiments as illustrated in FIG. 7, camera motor 712 includes an electric, magnetic, piezoelectric, or other type of motor for adjusting a viewing angle associated with adjustable camera 710. In an embodiment, camera motor 712 can operate on adjustable camera 710 in response to user input received via user input module 720. In another embodiment, camera motor 712 can operate on adjustable camera 710 in response to commands, instructions, or other signals from automatic adjustment component 714. In some instances, camera motor 712 can be a dedicated motor that only provides one type of adjustment to adjustable camera 710, and in other instances, camera motor 712 can be configured to integrate a number of types of adjustment capabilities. That is, in some embodiments, video communications system 700 includes a number of camera motors 712, each one configured for providing a certain aspect of adjustment, such as pan, tilt, zoom, and the like, to adjustable camera 710. In other embodiments, one or more of the motors can be integrated into a single motor that provides the capabilities associated with a number of different types of adjustments.

As indicated above, in some embodiments, camera motor 712 operates in response to commands, instructions, or other signals received from automatic adjustment component 714. Automatic adjustment component 714 receives information regarding the location of a region of interest with respect to adjustable camera 710 from edge detection component 716. Edge detection component 716 utilizes edge detection techniques to determine the boundaries of a region of interest in any given video frame. Information indicating those boundaries can be communicated, as a definition of a region of interest, to automatic adjustment component 714. In turn, automatic adjustment component 714 includes software and/or hardware for determining camera adjustments that must be made to maintain the region of interest within the viewing angle of adjustable camera 712. In embodiments, this can include determining that adjustable camera 712 should be tilted or panned by some calculated amount. Additionally, automatic adjustment component 714 can determine that a focal length associated with adjustable camera 714 should be adjusted such as, for example, by employing a zoom function. Automatic adjustment component 714 can also determine that other camera attributes such as aperture, focus, and the like should be adjusted. In further embodiments, adjustable camera 710 can be provided with a light source that can be used to apply light to objects within the viewing angle of adjustable camera 710. In such instances, automatic adjustment component 714 may be configured to determine when, and how much, light should be applied to the viewing angle.

According to various embodiments of the present invention, automatic adjustment component 714 not only can determine when adjustments are necessary, but can also determine how much adjustment is necessary and can generate the appropriate commands, instructions, or other signals to communicate to the appropriate components, thereby affecting the adjustment. For example, automatic adjustment component 714 could determine that adjustable camera 710 needs to be tilted downward by 25 degrees to maintain the region of interest within the viewing angle of the camera. Accordingly, automatic adjustment component 714 can communicate with camera motor 712 and instruct camera motor 712 to make the appropriate adjustment. In turn, camera motor 712 can cause adjustable camera 710 to tilt downward by 25 degrees. Sensors disposed within and around adjustable camera 710 can transmit data to automatic adjustment component such that automatic adjustment component 714 can determine a current position associated with adjustable camera 710.

In some embodiments of the present invention, automatic adjustment component can also operate in response to user input received from user input module 720. User input can define adjustments to be made, select types of adjustments to be made, and the like. In some embodiments, automatic adjustment component also receives input from configuration component 718. Configuration component 718 can receive user input via user input module 720. In an embodiment, user input module 720 includes, or is connected to, a call mode selector, such as that described with reference to FIG. 2. In this way, a user can select a call mode, and the user selection is communicated to configuration component 718. Configuration component 718 includes data storage 721 that contains information about feature or device settings that correspond to different selectable call modes.

According to embodiments, when a user selects a first call mode, configuration component 718 can reference data storage 721 to determine the settings defined by a first call mode configuration corresponding to the first call mode. In turn, configuration component 718 can communicate with various components, e.g., 714, 716, 724, 726, and 728, to cause the appropriate settings to be established. Additionally, further user input can be received via user input module 720 that causes configuration component 718 to apply user-defined settings, call mode configurations, and the like. For instance, in an embodiment, a user selects an HI call mode, causing configuration component 718 to reference data storage 721 to determine the settings associated with the corresponding HI call mode configuration. Configuration component 718 then instantiates the settings to establish the HI call mode configuration. For example, in one embodiment, configuration component 718 disables the microphone 726 and speakers 728 and enables adjustable camera 710 and automatic adjustment component 714. Additionally, configuration component can instruct color modification component 724 to apply color modifications to captured video images such that the captured video can be rendered using alternate color schemes such as, for example, black and white.

In an embodiment, once the HI call mode configuration is established, a region of interest can be determined either by edge detection component 716 or by a user via user input module 720. For example, video communications system 700 can include a touch-screen display (not shown, for clarity of illustration) on which video captured by adjustable camera 710 can be displayed. According to an embodiment, a user can select an option to define the region of interest, and subsequently can touch the touch-screen at a series of points along a perimeter of the region of interest that the user wishes to define. A visual representation of the resulting region of interest can be displayed to the user so that the user can make any desired adjustments and corrections. Once the user is satisfied with the user-defined region of interest, the user can submit the region of interest to the automatic adjustment component 714 and to the configuration component 718 so that the region of interest can be further maintained in the viewing angle of the camera 710. Configuration component 718 can also communicate with the edge detection component 716 to provide an interpreted definition of the user-defined region of interest so that the edge detection component 716 can continuously monitor the placement of the user-defined region of interest, thereby allowing automatic adjustment component 714 to ensure that the region of interest is maintained within the viewing angle of the adjustable camera 710.

As further illustrated in FIG. 7, video communications system 700 includes video processing components 722, color modification component 724, codec 730 and communication component 732. In various embodiments, color modification component 724 can be integrated with video processing components 722. Video processing components 722 include processing technology necessary for formatting captured video data such that the captured video can be compressed, communicated, and displayed. In an embodiment, video processing components 722 also include components for generating formatted video frames that include a region of interest and a simulated background. Examples of those components are described in U.S. patent application Ser. No. 12/262,423, filed Oct. 31, 2008, the entirety of which is expressly incorporated herein by reference.

Codec 730 can include any number of types of compression software and algorithms such as, for example, software for compressing video according to an MPEG format. In embodiments, communication component 732 includes software, hardware, or firmware for communicating video data to a network or another device. In embodiments, communication component 732 includes a video conferencing application. In other embodiments, communication component 732 includes an API that facilitates communicating video data.

Figure 8:
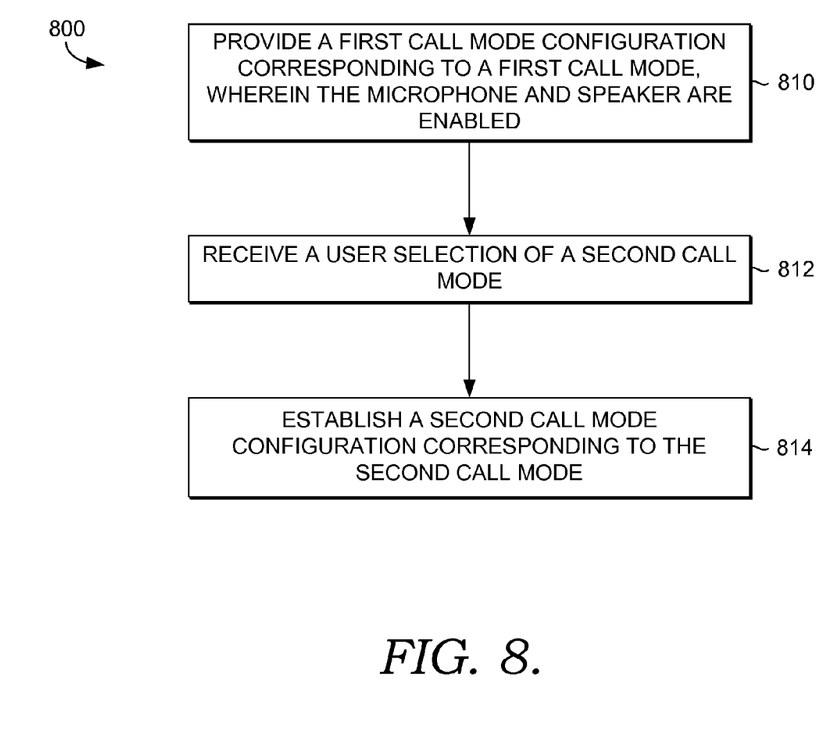
FIGS. 8 and 9 depict illustrative methods of establishing a call mode configuration on a mobile communications device.

To recapitulate, we have described a mobile device and methods for providing an enhanced video communications experience to hearing-impaired users. Turning to FIG. 8, a flow diagram is provided, showing an illustrative method 800 of establishing a call mode configuration on a mobile communications device having a display, a call mode selector, an adjustable camera, a microphone, and a speaker. At a first illustrative step, step 810, the method includes providing a first call mode configuration corresponding to a first call mode. In the first call mode, the microphone and speakers are enabled. Thus, for example, in an embodiment, the first call mode can comprise a normal voice call mode in which a user can make a normal voice call to another user by speaking into the microphone and listening through the speaker.

At step 812, a user selection of a second call mode is received. In an embodiment, the second call mode includes a hearing-impaired (HI) call mode. In another embodiment, the second call mode can be, for example, a normal video call mode in which a user can participate in audio/video communications. According to embodiments of the present invention, each call mode can be associated with a corresponding call mode configuration. Call mode configurations include predetermined settings for various features on the mobile device. Accordingly, at final illustrative step 814, a second call mode configuration is established. Establishing the second call mode configuration can include, for example, disabling the speaker and enabling the adjustable camera.

In one embodiment, a voice call mode is associated with a corresponding voice call mode configuration. When the mobile device is configured according to the voice call mode configuration, the microphone and the speakers are enabled such that a user can speak into the microphone and listen through the speakers. In an embodiment, a normal video call mode can have an associated normal video call mode configuration in which the microphone, speakers, and adjustable video camera are all engaged such that a user can participate in audio/video communications via the mobile device.

An HI call mode configuration can include various combinations of settings. In an embodiment, establishing an HI call mode configuration includes disabling the microphone. In another embodiment, establishing an HI call mode configuration includes disabling the speakers. Establishing an HI configuration can include enabling the adjustable video camera, configuring the display to render video signals received by the mobile device; adjusting the video camera to capture a region of interest or a set of features (e.g., the user's hands and face); adjusting camera zoom to maximize screen area covered by the features; and adjusting contrast and brightness to maximize contrast of movement within the region of interest. In some embodiments, establishing an HI call mode configuration also includes configuring the video camera and associated video processing software modules to produce black and white video. Additionally, other settings can be changed, altered, or included in an HI call mode configuration.

Figure 9:
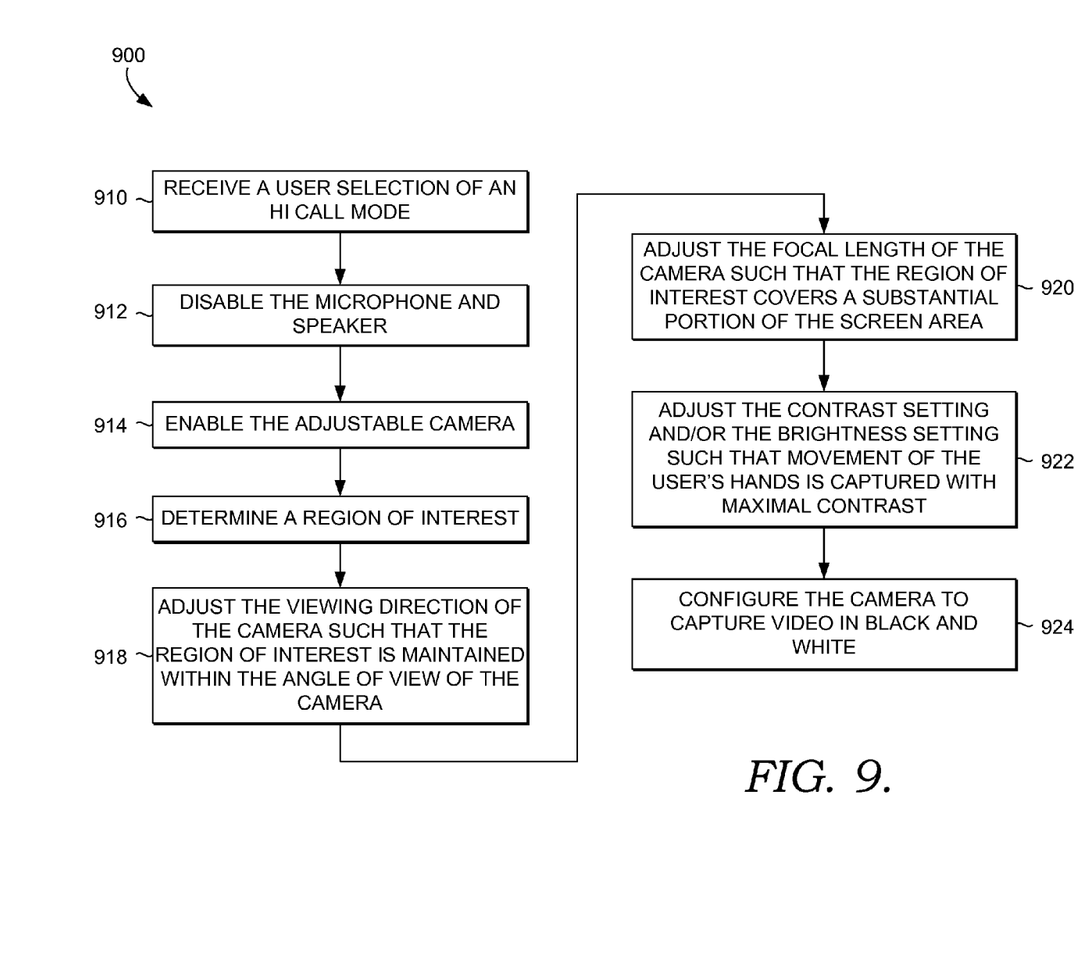

Turning now to FIG. 9, a flow diagram showing an illustrative method 900 of establishing a call mode configuration on a mobile communications device is shown. At a first illustrative step, step 910, a user selection of an HI call mode is received. In embodiments, a user can select between call modes by interacting with an input component on the mobile device such as, for example, a call mode selector. Call mode selectors can be input regions on a touch-screen display device, buttons on the mobile device, switches, and the like. In response to receiving the user selection of an HI call mode, a corresponding HI call mode configuration is established, as described in FIG. 9.

At step 912, the microphone and speaker are disabled and at step 914, the adjustable camera is enabled. The adjustable camera can be automatically adjusted. To do so, as shown at step 916, a region of interest is determined. In an embodiment, the region of interest is determined using edge detection techniques to identify the region containing a set of features such as the user's hands and face. The viewing direction of the camera can be adjusted by enabling such adjustment features as pan, tilt, and zoom, to maintain the region of interest within the angle of view of the camera, as indicated at step 918.

As shown at step 920, the focal length of the camera can also be adjusted (e.g., manually or automatically) such that the region of interest covers a substantial portion of a screen area associated with a video frame captured by the adjustable camera. At step 922, settings such as contrast or brightness can be adjusted such that movement within the region of interest (e.g., movement of the user's hands) is captured with maximal contrast with respect to other aspects of the captured video. At a final illustrative step 924, the camera is configured to capture (or encode) video in black and white. Although, in embodiments, the camera may capture video in color, the resulting video image data can be modified such that when the video data is rendered, it is presented in black and white.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. One or more non-transitory computer-readable media having computer-executable instructions embodied thereon for performing a method of establishing a call mode configuration on a mobile communications device the method comprising:
   implementing a display, a call mode selector, an adjustable video camera, a microphone, and a speaker on the mobile communications device, wherein the adjustable video camera includes a pivotal lens that allows a capture of images of a user;
   providing a first call mode configuration corresponding to a first call mode, wherein the microphone and the speaker are enabled;
   receiving a user selection of a second call mode, wherein the second call mode comprises a hearing-impaired (HI) call mode; and
   establishing a second call mode configuration corresponding to the second call mode, wherein establishing the second call mode configuration comprises disabling the speaker, disabling the microphone, and enabling the adjustable camera, and wherein the second call mode configuration comprises an HI call mode configuration.

2. The media of claim 1, wherein the first call mode comprises a normal voice call mode.

3. The media of claim 1, wherein the first call mode comprises a normal video call mode, and further wherein the display is configured to render a video signal received by the device.

4. The media of claim 1, further comprising configuring the display to render video signals received by the device.

5. The media of claim 1, further comprising adjusting the viewing direction of the adjustable video camera such that a region of interest is maintained within an angle of view of the camera, wherein the region of interest comprises a user's head and hands.

6. One or more non-transitory computer-readable media having computer-executable instructions embodied thereon for performing a method of establishing a hearing-impaired (HI) call mode configuration on a mobile communications device, the method comprising:
- implementing a display, a call mode selector, an adjustable video camera, a microphone, and a speaker on the mobile communications device, wherein the adjustable video camera includes a pivotal lens that allows a capture of images of a user;
- receiving a user selection of a hearing-impaired (HI) call mode; and
- establishing an HI call mode configuration, wherein establishing an HI call mode configuration comprises:
- disabling the microphone and the speaker;
- enabling the adjustable video camera;
- determining a region of interest, wherein the region of interest comprises the user's head and hands;
- adjusting a viewing direction of the adjustable video camera such that the region of interest is maintained within an angle of view of the adjustable camera;
- adjusting a focal length of the adjustable video camera such that the region of interest comprises a substantial portion of a screen area associated with a video frame captured by the adjustable video camera; and
- adjusting at least one of a contrast setting and a brightness setting such that movement of the user's hands is captured with maximal contrast with respect to other aspects of a series of video frames captured by the adjustable video camera.

7. The media of claim 6, further comprising configuring the adjustable video camera to capture video in black and white.

* * * * *